United States Patent
Kim et al.

(10) Patent No.: US 7,882,300 B2
(45) Date of Patent: Feb. 1, 2011

(54) APPARATUS AND METHOD FOR MANAGING NONVOLATILE MEMORY

(75) Inventors: Jeong-eun Kim, Gwangmyeong-si (KR); Jin-kyu Kim, Seoul (KR); Nam-yoon Woo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 658 days.

(21) Appl. No.: 11/772,377

(22) Filed: Jul. 2, 2007

(65) Prior Publication Data
US 2008/0104357 A1 May 1, 2008

(30) Foreign Application Priority Data
Oct. 27, 2006 (KR) .................. 10-2006-0105347

(51) Int. Cl.
G06F 12/00 (2006.01)
G06F 13/00 (2006.01)
(52) U.S. Cl. .............. 711/103; 711/100; 711/154; 711/170
(58) Field of Classification Search ............ 711/100, 711/103, 154, 170; 365/189.04, 218
See application file for complete search history.

(56) References Cited

U.S. PATENT DOCUMENTS

| 5,479,638 | A |   | 12/1995 | Assar et al. |
|---|---|---|---|---|
| 5,568,423 | A | * | 10/1996 | Jou et al. ............. 365/185.33 |
| 6,000,006 | A |   | 12/1999 | Bruce et al. |
| 6,895,464 | B2 | * | 5/2005 | Chow et al. ............ 711/103 |
| 2007/0083697 | A1 | * | 4/2007 | Birrell et al. .......... 711/103 |
| 2008/0168213 | A1 | * | 7/2008 | Kim ....................... 711/103 |
| 2008/0282024 | A1 | * | 11/2008 | Biswas et al. .......... 711/103 |

FOREIGN PATENT DOCUMENTS

| KR | 2000-39727 | 7/2000 |
|---|---|---|
| KR | 2001-29171 | 4/2001 |

* cited by examiner

*Primary Examiner*—Tuan V. Thai
(74) *Attorney, Agent, or Firm*—NSIP Law

(57) ABSTRACT

A nonvolatile-memory-management includes a generation unit that generates a free block list by arranging an entry including representative information of a group, of which free blocks adjacent to each other are grouped according to predetermined criteria, according to key values where the representative information are combined, a determination unit that determines parameters according to characteristics of data to be recorded, and a block-allocating unit that allocates free blocks satisfying the parameters as an area to be recorded with the data by referring to the free block list.

18 Claims, 8 Drawing Sheets

| FREE BLOCK NUMBER | 0 | 1 | 2 | 3 | 4 | 5 | 6 | 7 |
|---|---|---|---|---|---|---|---|---|
| ERASURE COUNT | 11 | 11 | 13 | 24 | 16 | 13 | 14 | 12 |
| MODIFIED ERASURE COUNT | 1 | 1 | 1 | 2 | 1 | 1 | 1 | 1 |

CurrentPtr_L : (Entry 3)
CurrentPtr_R : (Entry 7)
CurrentEntry_L : (2, 18, 17)
CurrentEntry_R : (7, 955, 5)

FIG. 10

TOTAL NUMBER OF ENTRIES : 2

TOTAL NUMBER OF TEMPORARY FREE BLOCKS : 20+15=35

APPARATUS AND METHOD FOR MANAGING NONVOLATILE MEMORY

CROSS-REFERENCE TO RELATED APPLICATION

This application claims the benefit of Korean Application No. 2006-105347, filed Oct. 27, 2006, in the Korean Intellectual Property Office, the disclosure of which is incorporated herein by reference.

BACKGROUND OF THE INVENTION

1. Field of the Invention

Aspects of the present invention relate to a nonvolatile memory. More particularly, aspects of the present invention relate to an apparatus and method for efficiently using a nonvolatile memory.

2. Description of the Related Art

Nonvolatile memories are widely used as storage media to store and handle data in embedded systems such as electronic appliances, communication devices, set-top boxes and mobile devices. Flash memory, which is a widely used kind of nonvolatile memory, can electrically erase and re-record data, and is appropriate for use in a mobile device because flash memory consumes less power compared to a storage media based on magnetic disks, has an initial access time that is short, and has a size that is small. Such a nonvolatile memory has multiple blocks that include multiple pages. Sizes of each block can be 16, 64, 128 or 256 KB (kilobyte) depending on the number of pages and the size of the pages that are included in each block. For a nonvolatile memory, a page refers to a unit for writing data in the nonvolatile memory, and a block refers to a unit for deleting the data in the nonvolatile memory.

A process where data is recorded in a nonvolatile memory is described below. First, if power is provided to the nonvolatile memory, all blocks of the nonvolatile memory are scanned, which establishes information of free blocks, which are blocks that include no data. If the information on the free blocks are established, the free blocks are arranged in an ascending order of an erasure count, from the lowest erasure count to the highest erasure count so that if there is an allocation request of the free blocks, the arranged free blocks are allocated to store data in a given order.

Because of such a characteristic of the nonvolatile memory, in order to rewrite a new data bit on the page where data bits are already stored, the whole block that includes the page should be first deleted. However, if the erasure count of the block exceeds a certain level, a bad block is generated, in which bits are fixed to a certain value. In a nonvolatile memory, bad blocks are the most important factor that decreases the life of the nonvolatile memory. In order to prevent the generation of bad blocks, the blocks of the nonvolatile memory need to be used evenly.

However, according to a related nonvolatile memory, a problem arise, whereby when allocating the free blocks in the given order to store certain data, the free blocks are allocated simply according to the erasure count of free blocks without considering the characteristics of the data to be stored. Accordingly, using the blocks of the nonvolatile memory evenly becomes difficult. For example, free blocks whose erasure counts are low may be used to store data that is not frequently updated, while free blocks whose erasure counts are high may be used to store data that are frequently updated. Such inefficient use of blocks promotes the generation of bad blocks.

Further, according to a related art nonvolatile memory, a problem arises because free blocks are allocated simply according to the erasure count of free blocks without considering the spatial relationship of the free blocks making it difficult to store data in neighboring free blocks.

SUMMARY OF THE INVENTION

An aspect of the present invention is to provide an apparatus and method of using the space of a nonvolatile memory evenly. Another aspect of the present invention is to provide an apparatus and method of storing data of similar characteristics in free blocks that are adjacent to each other when storing data in a nonvolatile memory.

According to an aspect of the present invention, a nonvolatile-memory-management apparatus includes a generation unit that generates a free block list by arranging an entry including representative information of a group, of which free blocks adjacent to each other are grouped according to predetermined criteria, according to key values where the representative information are combined, a determination unit that determines parameters according to characteristics of data to be recorded, and a block-allocating unit that allocates the free blocks satisfying the parameters as an area to be recorded with the data by referring to the free block list.

According to an aspect of the present invention, a nonvolatile-memory-management method includes generating a free block list by arranging an entry including representative information of a group, of which free blocks adjacent to each other are grouped according to predetermined criteria, according to key values where the representative information are combined, determining parameters according to characteristics of data to be recorded, and allocating free blocks satisfying the parameters as an area to be recorded with the data by referring to the free block list.

According to an aspect of the present invention, a nonvolatile memory management method includes obtaining an erase count of each free block of a non-volatile memory that contains a plurality of free blocks, grouping into one or more groups, one or more of the plurality of free blocks that have approximately the same erase count and are adjacent, determining one or more of the groups having a relatively low erase count and one or more of the groups having a relatively high erase count, and allocating one or more relatively low erase count groups to hot data and one or more relatively high erase count groups to cold data.

According to an aspect of the present invention, a non-volatile memory management apparatus includes a non-volatile memory, and a controller to obtain an erase count of each free block of a non-volatile memory that contains a plurality of free blocks, group into one or more groups, one or more of the plurality of free blocks that have approximately the same erase count and are adjacent, determine one or more of the groups having a relatively low erase count and one or more of the groups having a relatively high erase count, and allocate one or more relatively low erase count groups to hot data and one or more relatively high erase count groups to cold data.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIGS. 7A to 9B illustrate a method of allocating free blocks according to an aspect of the present invention.

DETAILED DESCRIPTION OF THE EMBODIMENTS

Reference will now be made in detail to aspects of the present invention, examples of which are illustrated in the accompanying drawings, wherein like reference numerals refer to the like elements throughout. The aspects are described below in order to explain the present invention by referring to the figures.

Aspects of the present invention are described hereinafter with reference to flowchart illustrations of user interfaces, methods, and computer program products according to aspects of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create method and/or apparatus to implement the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction method and/or apparatus that implement the function specified in the flowchart block or blocks. The computer program instructions may also be loaded into a computer or other programmable data processing apparatus to cause a series of operations to be performed in the computer or other programmable apparatus to produce a computer implemented process such that the instructions that execute on the computer or other programmable apparatus provide operations to implement the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of order. For example, two blocks shown in succession may in fact be executed substantially concurrently or the blocks may sometimes be executed in the reverse order depending upon the functionality involved.

Figure 1:
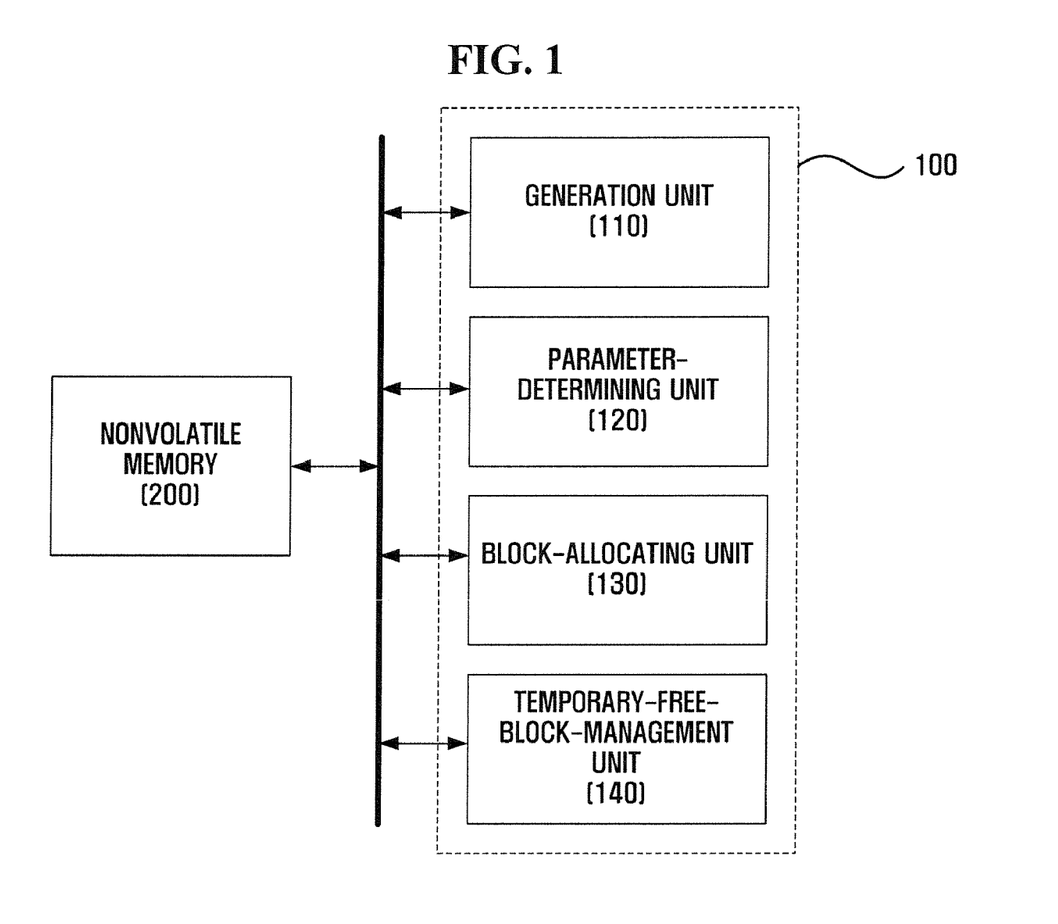
FIG. 1 illustrates an apparatus to manage a nonvolatile memory according to an aspect of the present invention.

An apparatus to manage a nonvolatile memory according to aspects of the present invention will be discussed with reference to FIGS. 1 to 10. FIG. 1 illustrates an apparatus 100 to manage a nonvolatile memory according to an aspect of the present invention. As illustrated, the nonvolatile-memory-management apparatus 100 includes a nonvolatile memory 200, a generation unit 110, a parameter-determining unit 120, a block-allocating unit 130, and/or a temporary-free-block-management unit 140. A nonvolatile memory according to an aspect of the present invention includes a single-level cell (SLC) nonvolatile memory and a multi-level cell (MLC)-nonvolatile memory. An example of the SLC-nonvolatile memory is described in the following. However, in other aspects, the MLC-nonvolatile memory is usable.

Figure 2:
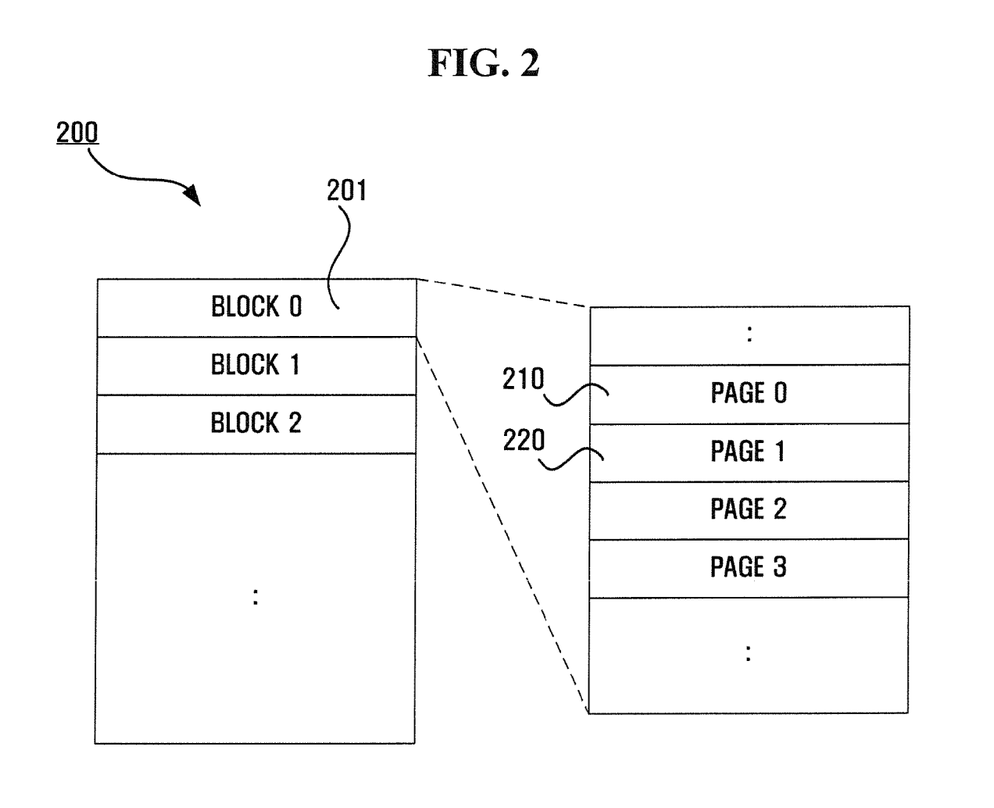
FIG. 2 illustrates the nonvolatile memory of FIG. 1 in greater detail.

FIG. 2 illustrates an SLC-nonvolatile memory according to an aspect of the present invention. As illustrated, the SLC-nonvolatile memory 200 includes multiple blocks 201, which in turn, includes multiple pages 210 and 220, for example. The pages 210 and 220 can be understood as units for writing and reading data, and the blocks 201 can be understood as units for deleting the data. The nonvolatile memory 200 can include an area (referred to a log area) (not shown) where information (referred to as log information) is written (or recorded), and a data area where data recorded by a user is stored. In various aspects, log information may also be referred to as a record that is recorded, and the log area may also be referred to as an area where a record is updated.

Referring to FIG. 1, the generation unit 110 reads information of the free blocks that have been recorded, then deleted, in the nonvolatile memory 200, or collects the information of the free blocks by scanning all of the blocks of the nonvolatile memory 200. In various aspects, free blocks refer to blocks without recorded data (i.e., blocks that are free or available for recording). Some examples of such information of the free blocks include a free block number, an erasure count (hereinafter referred to as an "ECNT"), and/or a modified erasure count (hereinafter referred to as an "MECNT").

In the aspect shown, the free block number represents a physical position occupied by the free block among the other blocks of the nonvolatile memory 200. For example, if the free block number is 2, the free block is physically in the second position among the blocks of the nonvolatile memory 200. The ECNT refers to the number of times (or frequency of) the deletion operation has been performed. Further, the MECNT refers to a number that is representative of the deletion frequency of the free blocks and can be defined as a quotient that is obtained by dividing the deletion frequency by 10, for example.

When the information of the free blocks are collected through the scan of all the blocks, the generation unit 110 arranges the collected information according to the free block numbers, and generates groupings of adjacent free blocks according to one or more predetermined criteria. For example, the generation unit 110 may generate one group of free blocks having the same MECNT among the free blocks that are adjacent to each other. The above grouping method will be described in greater detail with reference to FIG. 3.

Figure 3:
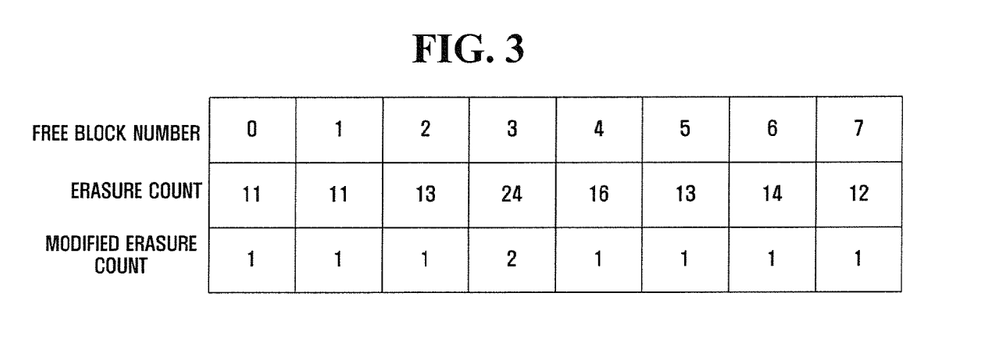
FIG. 3 illustrates information of free blocks according to an aspect of the present invention.

FIG. 3 illustrates information of free blocks arranged in an ascending order of the free block numbers. If information of each free block of the nonvolatile memory 200 is arranged, for example, as in FIG. 3, the generation unit 110 can generate a first group that includes free blocks whose free block numbers are 0, 1 and 2 (hereinafter, called "free block 0", "free block 1", and "free block 2"). As shown, the free block 0, free block 1, and free block 2 are physically adjacent to each other, and their MECNTs are all "1". Further, as shown in FIG. 3, there is not another free block that has the same MECNT as that of free block 3 (hereinafter, called "free block 3") among the free blocks that are adjacent thereto. Hence, the generation unit 110 may generate a second group that includes only free block 3. In comparison, free blocks whose free block numbers are 4, 5, 6 and 7, respectively, (hereinafter, called "free block 4", "free block 5", "free block 6", and "free block 7") may be grouped as a third group. As shown, the free block 4, the free block 5, the free block 6, and the free block 7 are physically adjacent to each other, and their MECNTs are all "1".

When the above grouping of the free blocks is completed, the generation unit 110 generates one or more entries (or information) of the groups that include representative information of each of the groups. By way of example, the representative information of a group may be an MECNT of one or more free blocks included in the group, a free block number of the free block that is positioned in a first position of the group (hereinafter, referred to as a "starting block number" Sblock), and/or the total number of free blocks included in the group (hereinafter referred to as a "range"). The entry for each group shown in FIG. 3 can include the illustrated representative information, though not required. In other aspects, other representative information may be used.

Figure 4:
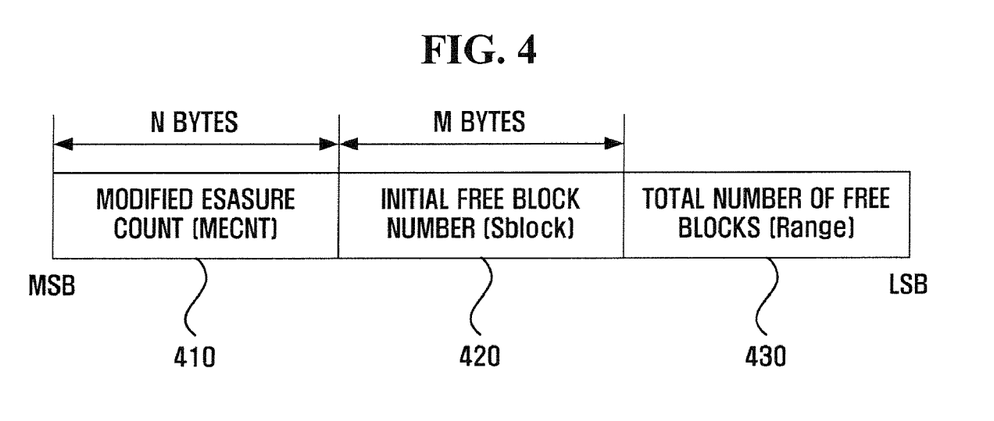
FIG. 4 illustrates a structure of an entry of a group of free blocks according to an aspect of the present invention.

FIG. 4 illustrates a structure of an entry of a group of free blocks according to an aspect of the present invention. As illustrated in FIG. 4, the entry includes a first area 410, a second area 420, and a third area 430, though not required. The first area 410 may be defined as an area that includes the first n bytes from an uppermost bit (or most significant bit (MSB)) of the entry. The MECNT of the free block included in a group can be recorded in the first area 410. For example, if the first group of FIG. 3 is used by way of example, the MECNT (or an indication thereof) of the free blocks included in the first group is "1". Hence, 1 can be recorded in the first area 410 of the entry for the first group.

The second area 420 can be defined as an area that includes the next m bytes after the first area 410 of the entry. The free block numbers of the first free block included in the group can be recorded in the second area 420. For example, the free block number (or an indication thereof) of the first free block of the first group may be 0. Hence, 0 (or an indication thereof) can be recorded in the second area 420 of the first group. In the aspect shown, the total number of free blocks (or an indication thereof) that are included in the group is recorded in the third area 430. For example, in FIG. 3, by way of example, the first group includes a total of three free blocks having free block numbers 0, 1, 2, respectively. Hence, "3" (or an indication thereof) can be recorded in the third area 430 of the entry for the first group.

Figure 5:
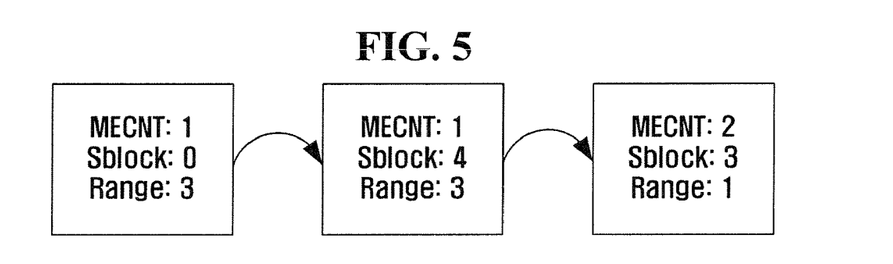
FIG. 5 illustrates a free block list constituted using modified erasure count information of free blocks illustrated in FIG. 3 as key values.
Figure 6:
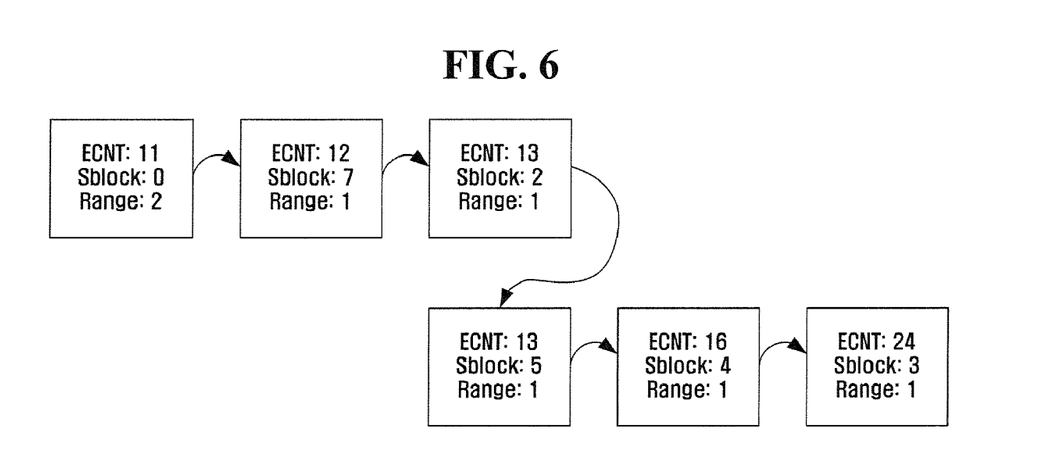
FIG. 6 illustrates a free block list constituted using erasure count information of free blocks illustrated in FIG. 3 as key values.

Referring back to FIG. 1, the generation unit 110 generates the entry having the above structure (or information), and then generates the free block list by arranging each entry based on key values, whereby the representative information of each group is combined as shown in FIG. 5. In the aspect shown, the key value to arrange the free block list may include the MECNT of the free blocks included in the group, the free block number of the first free block of the group, and/or the range of the free blocks of the group. For example, when n=2 and m=3, as shown in FIG. 3, the first group can have "65536 (0x10000)" as the key value because the MECNT of free blocks included in the first group is 1, and the free block number of the first free block is 3. Likewise, as shown in FIG. 3, the third group can have "65540 (0x10004)" as the key value because the MECNT of free blocks included in the third group is 1, and the free block number of the first free block of the third group is 4.

In an aspect of the present invention, if the key values of the first group, the second group, and the third group are as shown in FIG. 3, and if the entries for the groups are arranged in an ascending order based on the key values, a free block list shown in FIG. 5 can be obtained. Referring to FIG. 5, entries of the groups are arranged in the order of the first group, the third group, and the second group. As shown, the entry of the first group includes an MECNT of 1, an Sblock of 0, and a range of 3. The entry of the third group includes an MECNT of 1, an Sblock of 4, and a range of 3. The entry of the second group includes an MECNT of 2, an Sblock of 3, and a range of 1. In various aspects, the entries that include information of the free blocks having low MECNTs may be positioned to one side, for example, on the left side of the free block list, and the entries that include information of the free blocks having high MECNTs may be positioned to another side, for example, on the right side of the free block list.

It should be noted that the entries may include MECNT, the ECNT, or both. Nevertheless, comparing the free block list illustrated in FIG. 5 and the free block list illustrated in FIG. 6, the total number of entries included in the free block list illustrated in FIG. 5 is significantly less than the total number of entries included in the free block list illustrated in FIG. 6 because FIG. 5 illustrates a free block list that uses the MECNT of each free block as the key value, rather than FIG. 6 that uses the ECNT of each free block as the key value. Accordingly, using the MECNT as the key value reduces the number of entries in the free block list.

The free block list illustrated in FIG. 5 can be stored in a storage medium existing (or that exists) separately from the nonvolatile memory 200, such as a RAM, or can be stored in a log area (e.g., a specific storage area) of the nonvolatile memory 200.

Referring to FIG. 1, the parameter-determining unit 120 determines one or more parameters that depend on characteristics of data to be recorded. In aspects of the present invention, characteristics of the data include the possibility of deletion. Specifically, once written, the data may be referred to as frequently-updated data and rarely-updated data. For example, the log information is an example of frequently-updated data (hereinafter, called "hot data"), and a music file is an example of rarely-updated data (hereinafter, called "cold data"). In various aspects, the parameters may be entries or information of the free blocks.

In various aspects, the parameter includes a current parameter left (CurrentPtr_L), a current parameter right (CurrentPtr_R), a current entry left (CurrentEntry_L), and current entry right (CurrentEntry_R). The CurrentPtr_L and CurrentPtr_R indicate the entry in a free block list that includes information of the free blocks that can be used in allocating of areas of the nonvolatile memory where data will be recorded. The initial CurrentPtr_L indicates the entry having the minimum (or the smallest) key value in the free block list, and the initial CurrentPtr_R indicates the entry having the maximum (or the largest) key value in the free block list. If all free blocks included in a certain entry are allocated as the area where data will be recorded, the value of CurrentPtr_L (or CurrentPtl_R) indicates the entry position that is beside (or adjacent to) a certain entry. The CurrentPtr_L is used to retrieve free blocks where hot data will be recorded, and the CurrentPtr_R is used to retrieve free blocks where cold data will be recorded. Further, the CurrentEntry_L (or CurrentEntry_R) also includes information on the remaining free blocks that excludes the free blocks among free blocks that have been allocated and are included in the entry indicated by the CurrentPtr_L (or CurrentPtr_R). For example, the entry of the free block list can show the number of the free blocks that can be allocated as the area where the data will be recorded, the total number of blocks that can be allocated, and others. In various aspects, although discussed in terms of a left and a right side, such is not required. In various aspects, the current parameter is used to allocate free blocks that are to be recorded with hot or cold data.

In the aspect shown, the block-allocating unit 130 allocates free blocks that satisfy (or meet) parameters of the area where data will be recorded by referring to the free block list. A free-block-allocating method according to an aspect of the present invention will be described in greater detail with reference to FIGS. 7A to 9B.

Figure 7A:
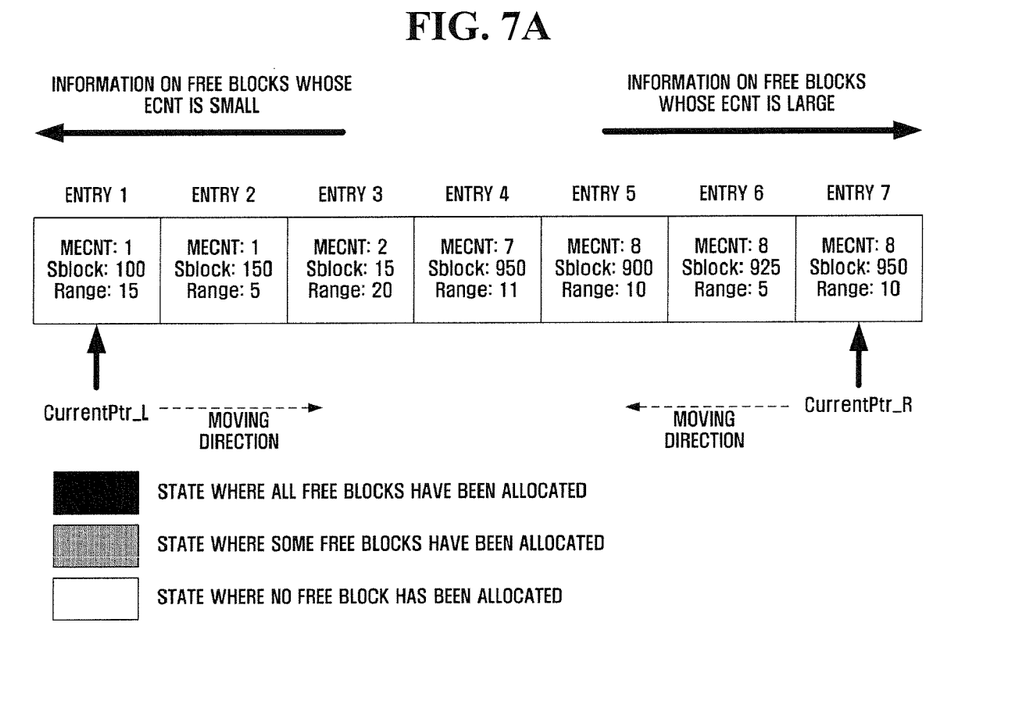
Figure 7B:
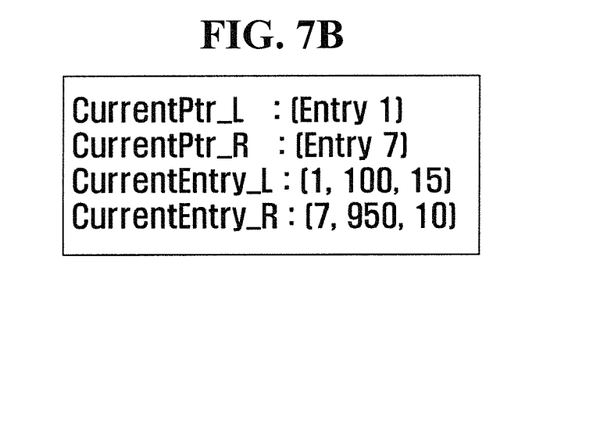

FIG. 7A illustrates a free block list and parameters according to an aspect of the present invention, and FIG. 7B illustrates initial values of the parameters illustrated in FIG. 7A. Given the settings of FIGS. 7A and 7B, the method of allocating 5 (five) free blocks to be recorded with cold data will be described in the following.

Since data to be recorded is cold data, the block-allocating unit 130 refers to the entry indicated by CurrentPtr_R, which indicates the free blocks having a high MECNT, as shown in FIG. 7A. In FIG. 7B, CurrentPtr_R refers to the entry 7. Then, the block-allocating unit 130 compares the number of the free blocks included in (or indicated to be available by) the current entry (currentEntry_R) associated with entry 7 and the number of the free blocks to be allocated for an area where the cold data will be recorded (hereinafter, called "requested free blocks"). As a result, if the number of free blocks included in (or indicated to be available by) the current entry (currentEntry_R) of FIG. 7B is larger than the number of the requested free blocks, the block-allocating unit 130 keeps the currently selected CurrentPtr_R, and allocates the requested number of free blocks from among free blocks included in the current entry (currentEntry_R), which in this case is associated with entry 7.

Specifically, as shown in FIG. 7B, because CurrentEntry_R is (7, 950, 10), entry 7 includes a total of 10 free blocks from free block number 950 to free block number 959. However, because the number of requested free blocks is 5, the block-allocating unit 130 keeps the value of CurrentPtr_R at entry 7, and only 5 free blocks corresponding to free blocks 950 to 954 among the 10 free blocks included in entry 7 are allocated as an area where cold data will be recorded.

Figure 8A:
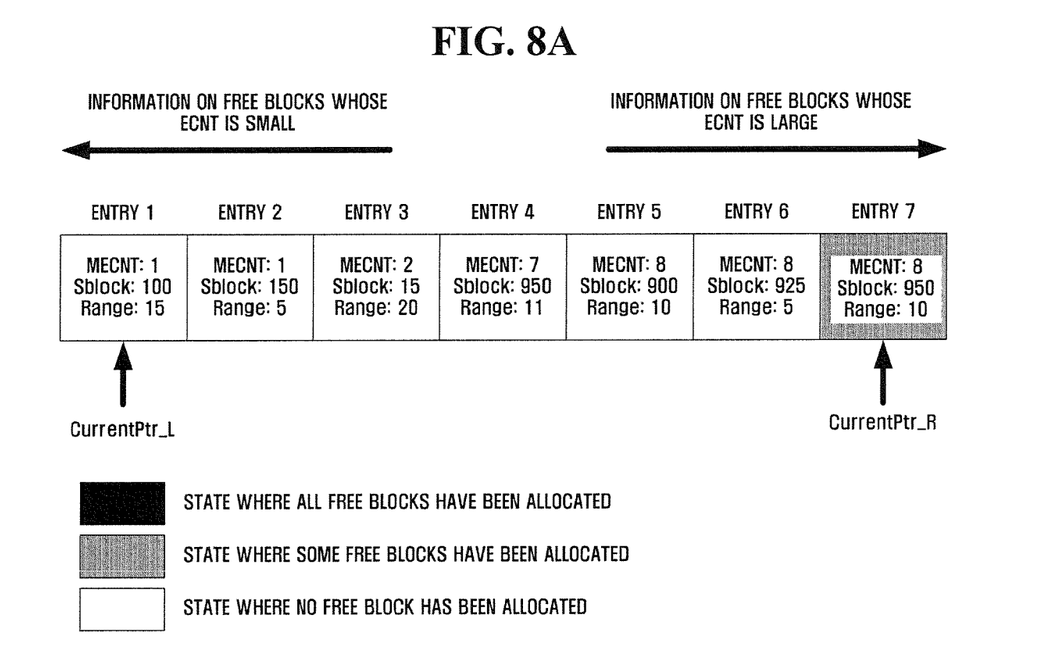
Figure 8B:
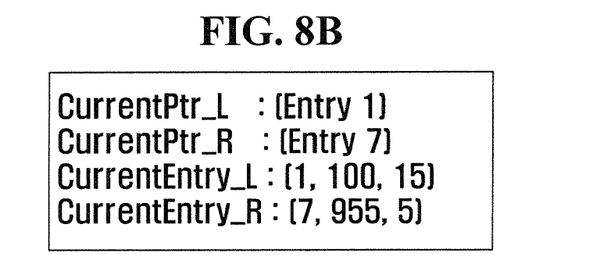

When the allocation of free blocks is completed, the value of the CurrentEntry_R associated with entry 7 is updated as shown in FIG. 8B to reflect the allocation of the 5 (five) free blocks from entry 7. The updated parameters are classified as a type of log information, and can be recorded in the log area of the nonvolatile memory 200. Further, the updated parameters can be stored in a storage medium such as a RAM that exists separately from the nonvolatile memory 200.

Given the settings of FIGS. 8A and 8B, the method of allocating 23 (twenty-three) free blocks as areas to be recorded with hot data will be described in the following. Since the data to be recorded is hot data, the block-allocating unit 130 allows free blocks having low MECNT to be allocated as an area to be recorded with hot data. To allocate low MECNT free blocks, the block-allocating unit 130 refers to the entry indicated by CurrentPtr_L. In the aspect shown in FIG. 8B, CurrentPtr_L refers to entry 1.

Accordingly, the block-allocating unit 130 refers to information represented by CurrentEntry_L, and compares the number of free blocks included in entry 1, and the number of free blocks to be allocated as an area where the hot data will be recorded (hereinafter, called "requested free blocks") as shown in currentEntry_L of FIG. 8B. Accordingly, if the number of free blocks included in (or available according to) the entry 1 is smaller than the number of the requested free blocks, the block-allocating unit 130 increases the CurrentPtr_L until the number of requested free blocks that becomes available is satisfied. Specifically, as shown in FIG. 8B, if the value of CurrentEntry_L is (1, 100, 15), then entry 1 includes a total of 15 free blocks from free blocks 100 to 114. However, the number of requested free blocks is 23, which the free blocks of entry 1 alone cannot fully provide. Accordingly, the block-allocating unit 130 increases the CurrentPtr_L until 23 free blocks are satisfied (or becomes available). As a result, CurrentPtr_L becomes 3.

Figure 9A:
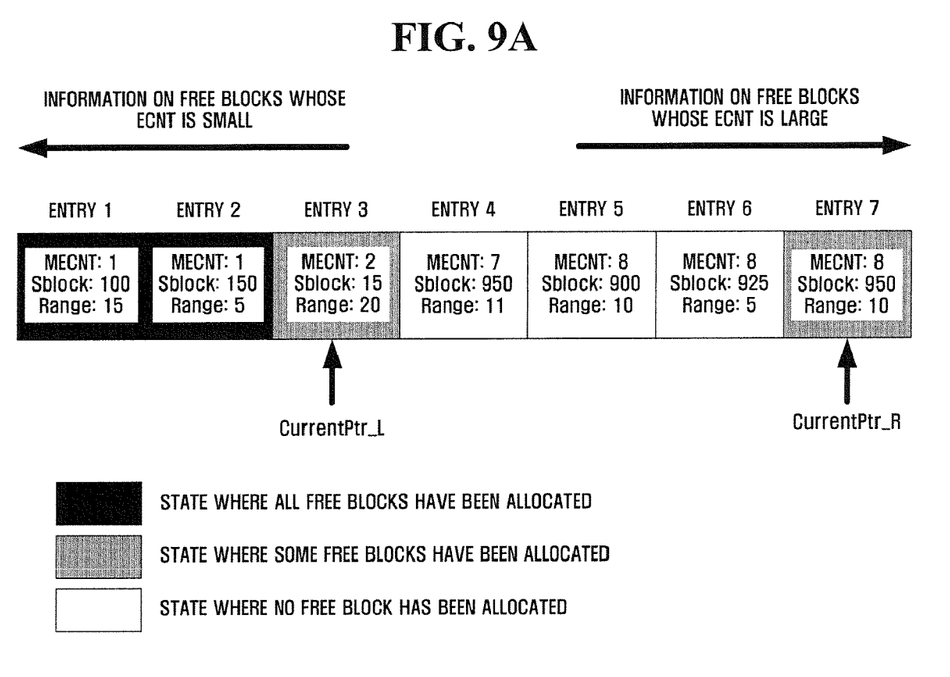

That is, the block-allocating unit 130 allocates 15 free blocks as the area to be recorded with the hot data among the 15 free blocks (free blocks 100 to 114) from entry 1, 5 free blocks from entry 2 (free blocks 150 to 154), and 3 free blocks (free blocks 15 to 17) out of the 20 free blocks from entry 3. As shown, the allocation state of the free blocks included in each entry is described in FIG. 9A by use of various shading. As illustrated in FIG. 9A, since only 3 free blocks are allocated for the area to be recorded with hot data among the 20 free blocks from entry 3, when the free blocks are allocated to the area to be recorded with other hot data, remaining free blocks of entry 3 are preferentially allocated.

Figure 9B:
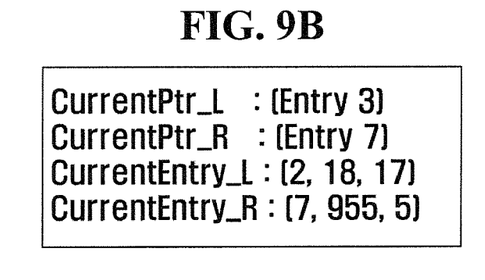

When the allocation of the 23 free blocks is completed, CurrentEntry_L is updated to that shown in FIG. 9B. The updated parameters are classified as a type of log information because of the block allocation, and can be recorded in the log area of the nonvolatile memory 200. Further, the parameters can be stored in a storage medium such as a RAM that exists separately from the nonvolatile memory 200.

Figure 10:
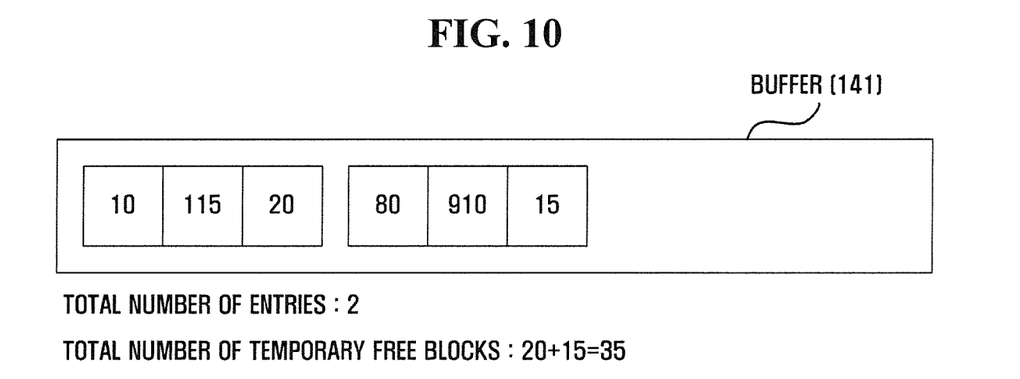
FIG. 10 illustrates entries that include information of temporary free blocks, arranged based on key values according to an aspect of the present invention.

Referring to FIG. 10, the temporary-free-block-management unit 140 manages one or more temporary free blocks. In the aspect shown, temporary free blocks refer to free blocks where or whose recorded data has been deleted temporarily, for example. The temporary-free-block-management unit 140 arranges one or more entries that include information of the temporary free blocks based on the key values, and store the entries in a RAM or a buffer 141 within the temporary free blocks.

The information on the temporary free blocks can be updated as a free block list in the following situations. For example, if the number of free blocks secured in the free block list is not sufficient, if the number of temporary free blocks stored in the buffer exceeds the critical value specified in advance, and/or if the user's command is inputted. In the above cases, information of the temporary free blocks can be updated as a free block list. Although discussed in terms of the MECNT in the aspects, use of the ECNT is possible in other aspects.

Figure 11:
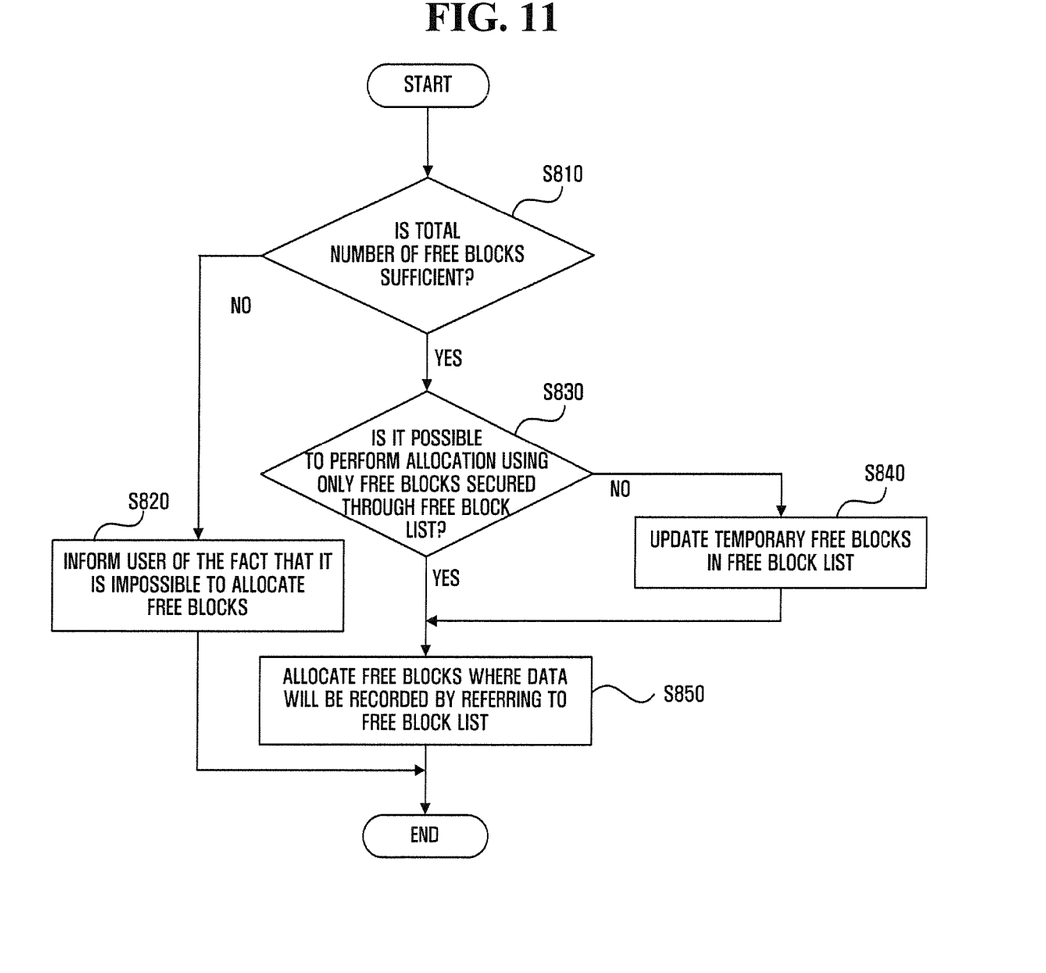
FIG. 11 is a flowchart illustrating a method of allocating free blocks of a nonvolatile memory according to an aspect of the present invention.

A method of managing a nonvolatile memory according to an aspect of the present invention will be described with reference to FIGS. 1 to 11. FIG. 11 is a flowchart illustrating a method of allocating free blocks of the nonvolatile memory according to an aspect of the present invention.

First, a generation unit 110 reads free block information recorded in a certain area of the nonvolatile memory 200, or scans all the blocks of the nonvolatile memory 200, to thereby generate a free block list that includes information of the free blocks of the nonvolatile memory 200. Specifically, the generation unit 110 generates one or more groups by grouping the free blocks that are physically adjacent to each other based on one or more criteria specified in advance. Then, the generation unit 110 arranges an entry that includes representative information of each group according to one or more key values made by (or combining) the sets of the representative information, to thereby generate a free block list.

In the aspect shown, some examples of the representative information are the MECNT of the free blocks that are included in the group, the starting free block number, and/or the total number of free blocks that are included in the group. Further, the key value is the combination of the MECNT and the starting free block number from among the representative information. Then, if there is a data-recording request from the user, the block-allocating unit 130 determines whether the total number of the available free blocks is sufficient in operation S810.

As a result of the determination in operation S810, if the number of the available free blocks is not sufficient (no in S810), the block-allocating unit 130 informs the user that it is not possible to allocate sufficient free blocks for recording of data in operation S820. For example, if the total number of the free blocks is smaller than the number of free blocks necessary for recording data, the block-allocating unit 130 can perform the work of allocating the free blocks.

As a result of the determination in operating S810, if the number of the free blocks is sufficient (yes in S810), the block-allocating unit 130 determines whether it is possible to allocate the needed free blocks using only the free blocks secured through the free block list in operation S830. That is, it is determined whether the number of the free blocks secured through the free block list is larger than the number of free blocks requested for the recording of data.

If the number of the free blocks secured through the free block list is smaller than the number of the requested free blocks (no in operation S830), the block-allocating unit 130 updates information of the temporary free blocks stored in the buffer 141 of the temporary-free-block-management unit 140 in operation S840, and allocates the free blocks by referring to the updated free block list in operation S850.

On the other hand, if the number of free blocks secured through the free block list is larger than the number of the requested free blocks, the block-allocating unit 130 allocates the free blocks by referring to the generated free block list in operation S850, which is described in greater detail with reference to FIG. 12 in the following.

Figure 12:
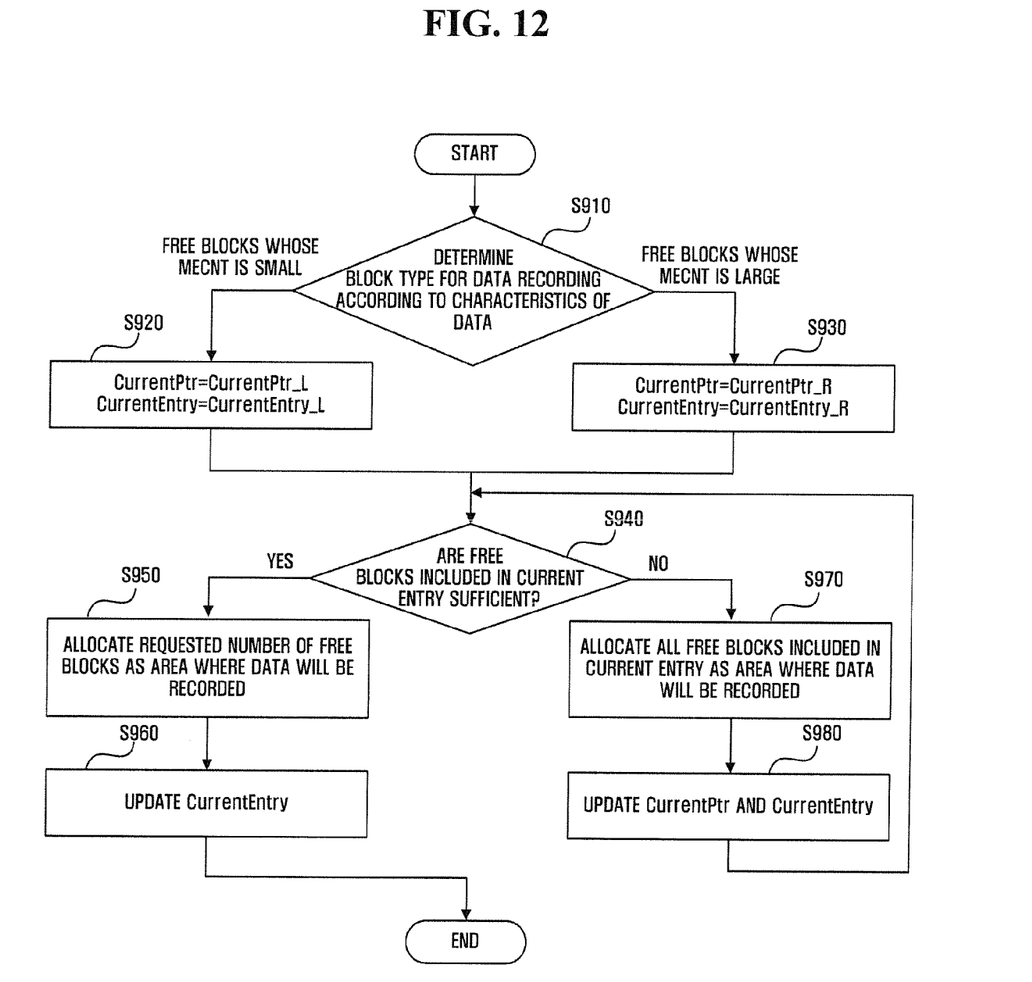
FIG. 12 is a flowchart illustrating operation S850 of FIG. 11 in greater detail.

FIG. 12 is a flowchart illustrating operation S850 of FIG. 11 in greater detail. As shown, the parameter-determining unit 120 determines the type of the free blocks where the data will be recorded in operation S910. For example, if the data to be recorded is hot data, the parameter-determining unit 120 enables hot data to be recorded in the free blocks whose MECNT is low. In the aspect shown, the block-allocating unit 130 refers to the CurrentPtr_L and CurrentEntry_L among a plurality of parameters in operation S920. If the data to be recorded is cold data, the parameter-determining unit 120 enables the cold data to be recorded in the free blocks whose MECNT is high. In the aspect shown, the block-allocating unit 130 refers to CurrentPtr_L and CurrentEntry_L among a plurality of parameters in operation S930.

If parameters necessary for allocating the free blocks are determined, the block-allocating unit 130 determines whether the number of the free blocks included in the entry (hereinafter, called a "current entry") indicated by CurrentPtr (that is, the CurrentPtr_L or CurrentPtr_R) in a free block list satisfies the number of the requested number of the free blocks in operation S940. As a result of the determination in operation S940, if the number of the free blocks that are included in the current entry satisfies the number of the requested free blocks (yes in operation S940), the block-allocating unit 130 allocates the requested number of the free blocks as the area to be recorded with the data, and to update the CurrentPtr ((CurrentPtr_L or CurrentPtr_R) and the current entry ((CurrentEntry_L or CurrentEntry_R) to reflect the allocation of the requested number of the free blocks over one or more entries and the remaining available number of the free blocks, in operation S960.

However, as a result of the determination in operation S940, if the number of the free blocks that are included in the current entry does not satisfy the number of the requested free blocks (no in operation S940), the block-allocating unit 130 allocates all of the free blocks included in the current entry as the area to be recorded with the data in operation S970. Then, the block-allocating unit 130 updates the CurrentPtr (CurrentPtr_L or CurrentPtr_R) and the CurrentEntry (CurrentEntry_L or CurrentEntry_R) to reflect the allocation of all of the requested number of the free blocks over one or more entries and the remaining available number of the free blocks, in operation S980. Then, the block-allocating unit 130 repeats operations S940, S970, and S980 until the number of requested free blocks is satisfied (or allocated).

The method and apparatus according to an aspect of the present invention has the following and/or other advantages. First, though the numbers of deletions between free blocks of a nonvolatile memory are different, because free blocks that are physically adjacent to each other can be grouped, data can be consecutively stored in the free blocks that are adjacent to each other, and the number of entries of the free block list can be reduced.

Second, when storing data in a nonvolatile memory, because the data is stored separately depending on characteristics of the data, the blocks of the nonvolatile memory can be used evenly, to thereby extend the life of the nonvolatile memory.

In various aspects, a volatile memory is within the scope of the present invention. Also, in various aspects, the use of and/or refers to any combination of the one or more elements.

The elements that constitute the device to manage the nonvolatile memory can be implemented as a unit. In the aspects shown, the term "unit", refers to, but is not limited to, a software or hardware component, such as a Field Programmable Gate Array (FPGA) or an Application Specific Integrated Circuit (ASIC), which performs certain tasks. A unit may advantageously be configured to reside in the addressable storage medium and to execute on one or more processors. Thus, a unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and units may be combined into fewer components and units or further separated into additional components and units.

In various aspects, the functions of the generation unit, the parameter-determining unit, the block-allocating unit, and/or a temporary-free-block-management unit may be performed by a controller.

Although a few aspects of the present invention have been shown and described, it would be appreciated by those skilled in the art that changes may be made in the aspects without departing from the principles and spirit of the invention, the scope of which is defined in the claims and their equivalents.

What is claimed is:

1. A nonvolatile-memory-management apparatus, comprising:
    a generation unit configured to generate a free block list by arranging an entry comprising representative information of a group, of which free blocks adjacent to each other are grouped according to predetermined criteria, according to key values where the representative information are combined;
    a determination unit configured to determine parameters according to characteristics of data to be recorded; and
    a block-allocating unit configured to allocate the free blocks satisfying the parameters as an area to be recorded with the data by referring to the free block list.

2. The apparatus of claim 1, wherein the representative information comprises at least one of: a total number of the free blocks included in the group, a modified erasure count (MECNT) of the free blocks included in the group, and a free block number of a first free block positioned at the beginning of the group.

3. The apparatus of claim 2, wherein the key values comprise the MECNT and the free block number.

4. The apparatus of claim 2, wherein the generation unit is further configured to group the free blocks whose MECNT are the same from among the free blocks that are adjacent to each other.

5. The apparatus of claim 2, wherein the block-allocating unit is further configured to:
    allocate the free blocks whose MECNT are smaller as the area to be recorded with the data, in the free block list, if the data is frequently-updated data; and
    allocate free blocks whose MECNT are larger as the area to be recorded with the data, in the free block list, if the data is not frequently-updated data.

6. The apparatus of claim 1, wherein the parameters comprise:
    one or more first parameters (CurrentPtr_L and/or CurrentPtr_R) indicating the entry that comprises information of the free blocks without the allocated free blocks from the free block list; and
    one or more second parameters (CurrentEntry_L and/or CurrentEntry_R) that comprise the location information of a first free block that is positioned at a beginning of the group of the remaining free blocks.

7. The apparatus of claim 1, further comprising a temporary-free-block-management unit configured to arrange entries that includes information of temporary free blocks, of which recorded data has been deleted, according to the key values.

8. The apparatus of claim 7, wherein the information of the temporary free blocks are updated to the free block list in response to one of: a user's command being inputted, a number of free blocks secured by the free block list being not sufficient, and a size of the area where the temporary free block information has been stored exceeding a predetermined size.

9. The apparatus of claim 7, wherein the information of the temporary free blocks are stored in a log area of the nonvolatile memory or a volatile memory.

10. The apparatus of claim 1, wherein the block-allocating unit is further configured to:
    allocate all of the free blocks included in a current entry as the area to be recorded with the data; and
    repeat updating of the parameters until a number of the requested free blocks is provided by a number of the free blocks included in the current entry indicated by the parameter be greater than a remaining number of the free blocks requested for recording the data.

11. A nonvolatile-memory-management method, comprising:
    generating a free block list by arranging an entry comprising representative information of a group, of which free blocks adjacent to each other are grouped according to predetermined criteria, according to key values where the representative information are combined;
    determining parameters according to characteristics of data to be recorded; and
    allocating the free blocks satisfying the parameters as an area to be recorded with the data by referring to the free block list.

12. The method of claim 11, wherein representative information comprises at least one of: a total number of the free blocks included in the group, a modified erasure count (MECNT) of the free blocks included in the group, and a free block number of a first free block positioned at the beginning of the group.

13. The method of claim 12, wherein the key values comprise the MECNT and the free block number.

14. The method of claim 12, wherein the generating of the free block list comprises grouping the free blocks whose MECNT are the same from among the free blocks that are adjacent to each other.

15. The method of claim 12, wherein the allocating of the free blocks comprises:
    allocating of the free blocks whose MECNT are smaller as the area to be recorded with the data, in the free block list, if the data is frequently-updated data; and
    allocating of the free blocks whose MECNT are larger as the area to be recorded with the data, in the free block list, if the data is not frequently-updated data.

16. The method of claim 11, wherein the parameters comprise:
    one or more first parameters (CurrentPtr_L and/or CurrentPtr_R) indicating the entry that comprises information of free blocks without the allocated free blocks from the free block list; and
    one or more second parameters (CurrentEntry_L and/or CurrentEntry_R) that comprise the location information of the first free block that is positioned at a beginning of the group of the remaining free blocks.

17. The method of claim 11, further comprising arranging entries that include information of temporary free blocks, of which recorded data has been deleted, according to the key values.

18. The method of claim 17, wherein the arranging comprises updating the information of the temporary free blocks to the free block list in response to one of: a user's command being inputted, a number of free blocks secured by the free block list being not sufficient, and a size of the area where the temporary free block information has been stored exceeding a predetermined size.

* * * * *